US007606901B2

(12) United States Patent
Heymann et al.

(10) Patent No.: US 7,606,901 B2
(45) Date of Patent: Oct. 20, 2009

(54) COMMUNICATION BETWEEN CLIENT AND SERVER COMPUTERS VIA HTTP, METHOD, COMPUTER PROGRAM PRODUCT AND SYSTEM

(75) Inventors: Juergen Heymann, Heidelberg (DE); Udo Offermann, Nussloch (DE); Petr Zdrahal, Wiesloch (DE)

(73) Assignee: SAP AG, Walldorf (DE)

(*) Notice: Subject to any disclaimer, the term of this patent is extended or adjusted under 35 U.S.C. 154(b) by 525 days.

(21) Appl. No.: 10/049,522

(22) PCT Filed: Jun. 13, 2001

(86) PCT No.: PCT/EP01/06701

§ 371 (c)(1),
(2), (4) Date: May 20, 2002

(87) PCT Pub. No.: WO01/97012

PCT Pub. Date: Dec. 20, 2001

(65) Prior Publication Data

US 2003/0009562 A1    Jan. 9, 2003

Related U.S. Application Data

(60) Provisional application No. 60/211,629, filed on Jun. 14, 2000.

(51) Int. Cl.
G06F 15/16 (2006.01)
(52) U.S. Cl. .......................................... 709/225; 726/5
(58) Field of Classification Search ................ 709/203, 709/204, 206, 207, 217, 218, 219, 226, 248, 709/225; 715/513, 760; 726/5
See application file for complete search history.

(56) References Cited

U.S. PATENT DOCUMENTS

| 5,530,905 | A | * | 6/1996 | Nichols et al. ............... 709/227 |
| 5,659,694 | A | * | 8/1997 | Bibayan ...................... 715/788 |
| 5,835,914 | A | * | 11/1998 | Brim .......................... 707/206 |
| 5,848,246 | A |   | 12/1998 | Gish |
| 5,852,717 | A | * | 12/1998 | Bhide et al. .................. 709/203 |

(Continued)

FOREIGN PATENT DOCUMENTS

GB          2399436 A  *  9/2004

OTHER PUBLICATIONS

Special Edition Using Windows 95 with Internet Explorer 4.0, Publisher Que, Feb. 17, 1998, ISBN 0-7897-1553-8, Chapter 17.*

(Continued)

Primary Examiner—Vivek Srivastava
Assistant Examiner—Ajay Bhatia
(74) Attorney, Agent, or Firm—Mintz, Levin, Cohn, Ferris, Glovsky and Popeo, P.C.

(57) ABSTRACT

A client computer and a server computer communicate via HTTP. The client computer uses a standard HTTP-browser. Substantially simultaneously with establishing a session by allocating a resource at the server computer, the server computer sends a termination instruction to the browser. The instruction remains unexecuted in the browser during the whole session. In the event that the server computer terminates the session (such as upon unloading the instruction from the browser), the browser causes the server computer to de-allocate the resource.

16 Claims, 10 Drawing Sheets

U.S. PATENT DOCUMENTS

| | | | |
|---|---|---|---|
| 5,870,473 | A | 2/1999 | Boesch et al. |
| 5,892,905 | A * | 4/1999 | Brandt et al. ............... 709/202 |
| 5,920,696 | A * | 7/1999 | Brandt et al. ............... 709/218 |
| 5,940,843 | A * | 8/1999 | Zucknovich et al. ........ 715/516 |
| 5,963,915 | A * | 10/1999 | Kirsch ......................... 705/26 |
| 5,995,756 | A * | 11/1999 | Herrmann .................. 717/178 |
| 6,011,805 | A | 1/2000 | Esteve et al. |
| 6,049,820 | A | 4/2000 | Murphy, Jr. et al. |
| 6,118,451 | A * | 9/2000 | Alexander .................. 715/809 |
| 6,125,384 | A * | 9/2000 | Brandt et al. ............... 709/203 |
| 6,237,060 | B1 * | 5/2001 | Shilts et al. ................. 709/203 |
| 6,275,858 | B1 * | 8/2001 | Bates et al. ................. 709/228 |
| 6,317,782 | B1 * | 11/2001 | Himmel et al. ............. 709/218 |
| 6,351,467 | B1 * | 2/2002 | Dillon ........................ 370/432 |
| 6,374,258 | B1 * | 4/2002 | Fujita et al. ............. 707/104.1 |
| 6,415,316 | B1 * | 7/2002 | Van Der Meer ............ 709/217 |
| 6,535,518 | B1 * | 3/2003 | Hu et al. ..................... 709/219 |
| 6,662,341 | B1 * | 12/2003 | Cooper et al. ............... 715/513 |
| 6,686,932 | B2 * | 2/2004 | Rath et al. .................. 709/219 |
| 6,757,713 | B1 * | 6/2004 | Ogilvie et al. .............. 709/206 |
| 6,766,351 | B1 * | 7/2004 | Datla .......................... 709/203 |
| 6,782,425 | B1 * | 8/2004 | Germscheid et al. ........ 709/227 |
| 6,785,659 | B1 * | 8/2004 | Landsman et al. .......... 709/200 |
| 6,832,239 | B1 * | 12/2004 | Kraft et al. .................. 709/203 |
| 6,832,380 | B1 * | 12/2004 | Lau et al. .................... 709/203 |
| 6,859,928 | B2 * | 2/2005 | Wright ....................... 709/203 |
| 6,874,017 | B1 * | 3/2005 | Inoue et al. ................. 709/217 |
| 6,880,123 | B1 * | 4/2005 | Landsman et al. .......... 709/217 |
| 6,901,425 | B1 * | 5/2005 | Dykes et al. ................ 709/203 |
| 7,171,661 | B1 * | 1/2007 | Pinera et al. ................ 709/203 |
| 2001/0001863 | A1 * | 5/2001 | Shuster ....................... 709/203 |
| 2002/0012010 | A1 * | 1/2002 | Pasquali ..................... 709/203 |
| 2002/0049696 | A1 * | 4/2002 | Fujita et al. ..................... 707/1 |
| 2002/0091732 | A1 * | 7/2002 | Pedro ......................... 707/505 |
| 2002/0143723 | A1 * | 10/2002 | Tsai ............................... 707/1 |
| 2002/0194292 | A1 * | 12/2002 | King .......................... 709/213 |
| 2003/0009562 | A1 * | 1/2003 | Heymann et al. ........... 709/227 |
| 2003/0088831 | A1 * | 5/2003 | Bauer et al. ................. 715/516 |
| 2004/0073631 | A1 * | 4/2004 | Keorkunian et al. ........ 709/219 |
| 2004/0090450 | A1 * | 5/2004 | Gill et al. .................... 345/709 |
| 2004/0177127 | A1 * | 9/2004 | Seraphin .................... 709/203 |
| 2005/0027788 | A1 * | 2/2005 | Koopmans et al. .......... 709/200 |
| 2005/0044240 | A1 * | 2/2005 | DePree ....................... 709/228 |
| 2005/0096996 | A1 * | 5/2005 | Hall et al. ..................... 705/26 |
| 2005/0099646 | A1 * | 5/2005 | Jeyachandran et al. ..... 358/1.14 |
| 2005/0203890 | A1 * | 9/2005 | Chen et al. ..................... 707/3 |
| 2005/0213666 | A1 * | 9/2005 | Kaneko et al. ......... 375/240.26 |
| 2005/0216844 | A1 * | 9/2005 | Error et al. ................. 715/745 |
| 2005/0240358 | A1 * | 10/2005 | Sasaki et al. ................. 702/20 |
| 2005/0244147 | A1 * | 11/2005 | Yamagata et al. ........... 386/125 |

OTHER PUBLICATIONS

Andrew J. Maywah, An implementation of Secure Web Client Using SPKI/SDSI Certificates, May 2000, MIT.*

Simon Spero, "Session Control Protocol," (2 pages) <www.w3.org./Protocols/HTTP-NG/http-ng-scp.html>.

"Session Identification URI," W3C Working Draft, WD-session-id-960221, (10 pages) <www.w3.org/TR/WD-session-id.html>.

"Final HTTP-NG Activity Statement," W3C, (3 pages) <www.w3.org/Protocols/HTTP-NG/Activity.html>.

Davidson, J. D. And Ahmed, S., "Java™ Servlet API Specification," Version 2.1a, Java Software Division, A Division of Sun Microsystems, Inc., Palo Alto, California (Nov. 1998).

* cited by examiner

```
1    <HTML>    <HEAD>    <TITLE> Instruction-360 </TITLE>
         <script language="JavaScript">
2    var gs TerminationURL=" ... "
3    function sending_560_second_request()
         if (gsTerminationURL != "")
             alert("sending_560_second_request_240: n"
             + "Client...:" + gsTERMINATIONURL );
4    function receiveSessInfo( termURL )
         gsTerminationURL = termURL;
5    </sript> </Head>
6    <BODY onunload="sending_560_second_request()">
7    This is first frame 215 ... The session has now started.
8    Preferably, content frames are indicated inside a content
     frame:
9    <IFRAME  scr="content-page-335.htm" width="50%"
     height="50%" frameborder="yes" scrolling="yes" >
10   </IFRAME>    </BODY>    </HTML>
```

FIG. 6

COMMUNICATION BETWEEN CLIENT AND SERVER COMPUTERS VIA HTTP, METHOD, COMPUTER PROGRAM PRODUCT AND SYSTEM

This application claims the benefit of provisional application No. 60/211,629, filed Jun. 14, 2000 the content of which is incorporated herein by reference.

FIELD OF THE INVENTION

The present invention generally relates to data processing and, more particularly, relates to computer systems, computer programs, and methods for communication between client and server computers by hypertext transfer protocol (HTTP) and browsers.

BACKGROUND OF THE INVENTION

In most data communication systems, it is required to assure the complete transmission of information between two computers.

Typically, the user operates a personal computer (referred to as "client computer") that has to communicate with a remote computer (referred to as "server computer"). The client computer has communication software to communicate with the server computer and the server computer has application software to execute a business application.

During the communication dialog (also referred to as "session"), the user enters orders (e.g., for commercial items), issues a query (e.g., in a database), requests the server computer to analyze data, or performs other actions. During each session, the server computer allocates resources, for example, to store previous input data and intermediate results.

Traditionally, the communication software on the client computer is specialized to the particular application software of the server computer. Often the communication software comprises a graphical user interface that is tailored to the application. Client and server computers use communication protocols that immediately notify the server computer when the user at the client computer terminates the session. Before terminating, the server computer asks the user to save data that he or she has inputted (so-called "user committing"). The server computer then releases (de-allocates) the resources.

Using specialized communication software at the client computer is inconvenient. Besides the time that is required to install it, installing the communication software might require the payment of license fees. Also, regular and costly updates are required. There is a tendency to communicate with standard "off-the-shelf" software such as Internet browsers. Browsers are installed in almost every personal computer. The hypertext transfer protocol (HTTP) became the standard communication protocol in the Internet. However, HTTP does not automatically notify the server computer about a session termination by the client computer.

Typically, the server computer waits for a predetermined period of time after the last client-server-communication and then releases the resources. Keeping the resources allocated during this period is inconvenient, for example, because the resource blocks memory and slows down performance.

For client-server communication, the following references are useful: U.S. Pat. No. 5,848,246 (Gish), U.S. Pat. No. 6,011,805 (Esteve).

There is an ongoing need to provide improved computer systems, computer programs, and methods for communication between client and server computers that use HTTP-browsers.

SUMMARY OF THE INVENTION

The present invention provides improved client-server-communication, while the client computer uses a standard HTTP-browser. Substantially simultaneously with establishing a session by allocating a resource at the server computer, the server computer sends a termination instruction to the browser. The instruction remains in the browser unexecuted during the whole session. In the event that the server computer terminates the session, such as upon unloading the instruction, the client computer causes the server computer to de-allocate the resource.

According to an embodiment of the present invention, a method is provided for communication between a client computer and a server computer that both use HTTP. The client computer uses an HTTP-browser. The method comprises the following steps:

sending a first request from the client computer to the server computer;

upon receiving the first request, the server computer, (i) allocating a resource at the server computer, the resource with an identifier, and (ii) returning a predetermined close instruction to the browser, the close instruction carrying the identifier;

upon unloading the close instruction from the browser of the client computer, sending a second request from the client computer to the server computer, the second request carrying the identifier and indicating to de-allocate the resource; and upon receiving the second request from the client computer, by the server computer de-allocating the resource.

It is an advantage that the close instruction in the browser virtually couples the client computer to the server computer. In the event of unloading, the server computer is notified and is able to release the resource. Further, the browser may be a standard browser that interprets the close instruction but that does not need to be modified.

Preferably, after the server computer has returned the predetermined close instruction, and before the server computer receives the second request from the client computer, the server computer consecutively sends content pages to the client computer. Preferably, in the step returning the predetermined close instruction, the browser presents the close instruction in a first frame and presents the content pages in a second frame. Preferably, the close instruction prevents selected content pages from being cached by the browser. Preferably, when sending the second request, the client computer sends the second request to a predetermined address of the server computer. Preferably, in the step returning a predetermined close instruction, the predetermined close instruction comprises a script. Preferably, in the step returning a predetermined close instruction, the script does not lead to a presentation by the browser.

According to another embodiment of the present invention, a computer program product is provided for HTTP-communication between a client computer and a server computer, wherein the client computer has a browser. The computer program product has program code portions that cause a client processor in the client computer and a server processor in the server computer to control the communication. The computer program product comprises: code portions that cause the client processor to send a first request to the server computer; code portions that—upon receiving the first request by the server computer—cause the server processor to (i) allocate a resource at the server computer, the resource including an identifier, and (ii) return a predetermined close instruction to the browser, the close instruction carrying the identifier; code portions that—upon unloading the close instruction from the browser of the client computer—cause the client processor to send a second request to the server computer, the second request carrying the identifier and indicating to de-allocate the resource; and code portions that—upon receiving the second request from the client computer—cause the server processor to de-allocate the resource.

Preferably, the code portions cause the client processor to provide such a close instruction that the browser provides a first frame to present the close instruction in a first frame and provides a second frame to present content pages that the client computer receives from the server computer. Preferably, the code portions cause the client processor to provide a close instruction such that the caching of selected content pages by the browser is prevented. Preferably, the code portions cause the client processor to provide such a close instruction so that the client computer sends the second request to a predetermined address of the server computer.

According to still another embodiment of the present invention, computer readable media is provided that separately stores the program code portions causing the client processor and the server processor to operate.

According to another embodiment of the present invention, a computer system is provided that includes a client computer and a server computer, both computers using HTTP for communication and the client computer using an HTTP-browser. The client computer sends a first request to the server computer; the server computer (upon receiving the first request) (i) allocates a resource (resource including an identifier), and (ii) returns a predetermined close instruction to the browser of the client computer (the close instruction carrying the identifier); the client computer (upon unloading the close instruction from the browser) sends a second request to the server computer (the second request carrying the identifier and indicating to de-allocate the resource); and the server computer (upon receiving the second request from the client computer) de-allocates the resource.

Preferably, the client computer presents the close instruction in a first frame and presents the content pages in a second frame. Preferably, the server computer provides the close instruction such that in the client computer the close instruction prevents selected content pages from being cached by the browser.

According to yet another embodiment of the present invention, a method is provided for communication between a client computer and a server computer. Both computers use HTTP and the client computer uses an HTTP-browser. The client computer sends a request to the server computer. Upon receiving the request, the server computer: allocates a resource at the server computer (the resource including an identifier and a time-out period), returns a close instruction to the client computer (the close instruction including the time-out period and the identifier), measures the time during which communication between the client and server computers is idle, and de-allocates the resource when the measured time reaches the time-out period. Upon receiving the close instruction, the client computer measures the time during which the communication between the client computer and the server computer is idle, and displays a warning to the user if the measured time reaches a predetermined fraction of the time-out period.

It is an advantage that that unintentional lapsing the time-out on the client side is prevented.

In accordance with another embodiment of the present invention, a computer program product is provided for controlling HTTP-communication between a client computer and a server computer, wherein the client computer has a browser. The computer program product has a client program portion to control a client processor and a server program portion to control a server processor. The program is characterized in that the client program product portion causes the client processor to send a request from the client computer to the server computer; upon receiving the request by the server computer, the server program portion causes the server processor to allocate a resource at the server computer (resource with identifier and time-out period (T)), to return a close instruction to the client computer (close instruction with time-out period (T) and identifier), to measure the time (t) during which communication between the client computer and the server computer is idle, and to de-allocate the resource when the measured time (t) reaches the time-out period (T); and upon receiving the close instruction by the client computer, the client program portion causes the client processor to measure the time (t) during which the communication between the client computer and the server computer is idle, and to display a warning to the user if the measured time (t) reaches a predetermined fraction (T/X) of the time-out period (T).

According to still another embodiment of the present invention, a method is provided for communication between a client computer and a server computer, (HTTP, client computer with HTTP-browser). The method comprises: sending a first request from the client computer to the server computer; allocating a resource at the server computer, the resource including an identifier; returning a predetermined response page to the browser, the response page carrying the identifier and carrying browser instructions; as instructed by the response page, periodically sending the second requests by the browser to the server computer, the second requests by the browser to the server computer, the second requests carrying the identifier; and at the server computer, periodically checking the arrival of the second requests with the identifier from the client computer and de-allocating the resource when a predetermined time period (T) has lapsed since the last arrival.

BRIEF DESCRIPTION OF THE DRAWINGS

FIG. 6 is a simplified code listing of an instruction that participates in the method of FIG. 3;

DETAILED DESCRIPTION OF THE INVENTION

For convenience, a list of references is provided prior to the claims. Logical addresses (e.g., URL) are indicated in quotation marks and conveniently cite the addressed element by its name and reference number; such as "server-computer-901" being an address for server computer 901.

Figure 1:
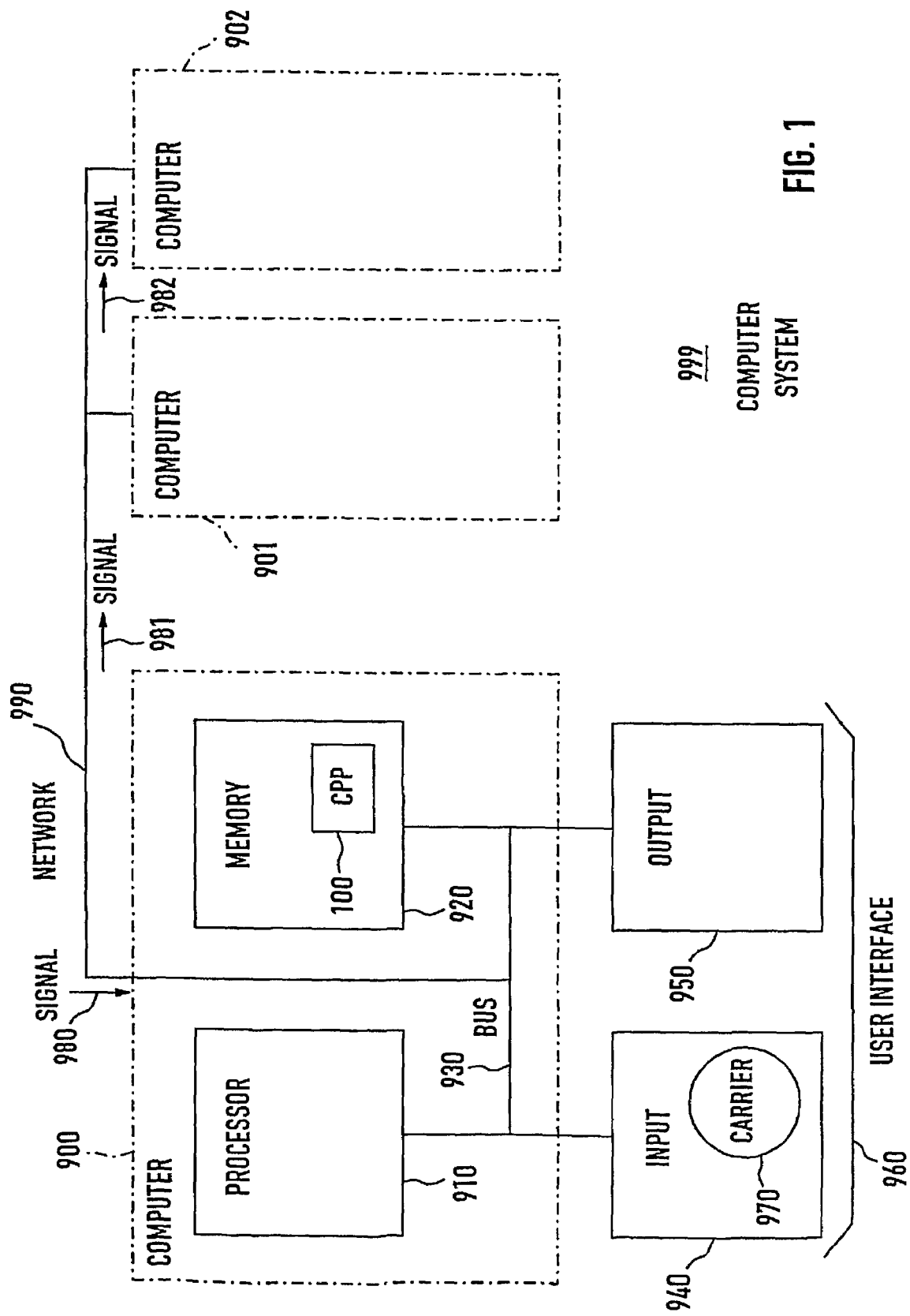
FIG. 1 illustrates a simplified block diagram of a computer network system having a plurality of computers.

FIG. 1 illustrates a simplified block diagram of computer network system 999 having a plurality of computers 900, 901, 902 (or 90$q$, with q=0 ... Q-1, Q any number).

Computers 900-902 are coupled via inter-computer network 990. Computer 900 comprises 910, memory 920, bus 930, and, optionally, input device 940 and output device 950 (I/O devices, user interface 960). As illustrated, features of the invention may be implemented by computer program product 100 (CPP), program carrier 970 and program signal 980, collectively "program".

In respect to computer 900, computer 901/902 is sometimes referred to as "remote computer", computer 901/902 is, for example, a server, a router, a peer device or other common network node, and typically comprises many or all of the elements described relative to computer 900. Hence, elements 100 and 910-980 in computer 900 collectively illustrate also corresponding elements 10$q$ and 91$q$-98$q$ (shown for q=0) in computers 90$q$.

Computer 900 is, for example, a conventional personal computer (PC), a desktop and hand-held device, a multiprocessor computer, a pen computer, a microprocessor-based or programmable consumer electronics, a minicomputer, a mainframe computer, a personal mobile computing device, a mobile phone, a portable or stationary personal computer, a palmtop computer or the like.

Memory 920 symbolizes elements that temporarily or permanently store data and instructions. Although memory 920 is conveniently illustrated as part of computer 900, memory function can also be implemented in network 990, in computers 901/902 and in processor 910 itself (e.g., cache, register), or elsewhere. Memory 920 can be a read only memory (ROM), random access memory (RAM), or a memory with other access options. Memory 920 is physically implemented by computer-readable storage medium, such as, for example, (a) magnetic media, like a hard disk, a floppy disk, or other magnetic disk, a tape, a cassette tape; (b) optical media, like optical disk (CD-ROM, digital versatile disk - DVD); (s) semiconductor media, like DRAM, SRAM, EPROM, EEPROM, memory stick, or by any other media.

Optionally, memory 920 is distributed across different media. Portions of memory 920 can be removable or non-removable. For reading from media and for writing in media, computer 900 uses devices well known in the art such as, for example, disk drives, tape drives.

Memory 920 stores support modules-such as, for example, a basic input output system (BIOS), an operating system (OS), a program library, a compiler, an interpreter, and a text-processing tool. Support modules are commercially available and can be installed on computer 900 by those of skill in the art. For simplicity, these modules are not illustrated.

CPP 100 comprises program instructions and—optionally—data that cause processor 910 to execute method steps of the present invention. Method steps are explained with more detail below. In other words, CPP 100 defines the operation of computer 900 and its interaction in network system 999. For example and without the intention to be limiting, CPP 100 can be available as source code in any programming language, and as object code ("binary code") in a compiled form. Persons of skill in the art can use CPP 100 in connection with any of the above support modules (e.g., compiler, interpreter, operating system).

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture comprising a computer readable medium having computer readable program code means embodied therein for executing the method of the present invention.

Having described CPP 100, program carrier 970, and program signal 980 in connection with-computer 900 is convenient. Optionally, program carrier 971/972 (not shown) and program signal 981/982 embody computer program product (CPP) 101/102 to be executed by processor 911/912 (not shown) in computers 901/902, respectively.

Input device 940 symbolizes a device that provides data and instructions for processing by computer 900. For example, device 940 is a keyboard, a pointing device (e.g., mouse, trackball, cursor direction keys), microphone, joystick, game pad, scanner. Although the examples are devices with human interaction, device 940 can also operate without human interaction, such as, a wireless receiver (e.g., with satellite dish or terrestrial antenna), a sensor (e.g., a thermometer), a counter (e.g., goods counter in a factory). Input device 940 can serve to read carrier 970.

Output device 950 symbolizes a device that presents instructions and data that have been processed. For example, a monitor or a display, (cathode ray tube (CRT), flat panel display, liquid crystal display (LCD), speaker, printer, plotter, vibration alert device. Similar as above, output device 950 communicates with the user, but it can also communicate with further computers.

Input device 940 and output device 950 can be combined to a single device; any device 940 and 950 can be provided optional.

Bus 930 and network 990 provide logical and physical connections by conveying instruction and data signals. While connections inside computer 900 are conveniently referred to as "bus 930", connections between computers 900-902 are referred to as "network 990". Optionally, network 990 comprises gateways being computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, magnetic, optical or wireless (radio) signals.

Networking environments (as network 990) are commonplace in offices, enterprise-wide computer networks, intranets and the internet (i.e. world wide web). The physical distance between a remote computer and computer 900 is not important. Network 990 can be a wired or a wireless network. To name a few network implementations, network 990 is, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

Transmission protocols and data formats are known, for example, as transmission control protocol/internet protocol (TCP/IP), hyper text transfer protocol (HTTP), secure HTTP, wireless application protocol, unique resource locator (URL), a unique resource identifier (URI), hyper text markup language HTML, extensible markup language (XML), extensible hyper text markup language (XHTML), wireless application markup language (WML), etc.

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card. Computer and program are closely related. As used hereinafter, phrases, such as "the computer provides" and "the program provides", are convenient abbreviation to express actions by a computer that is controlled by a program.

Figure 2:
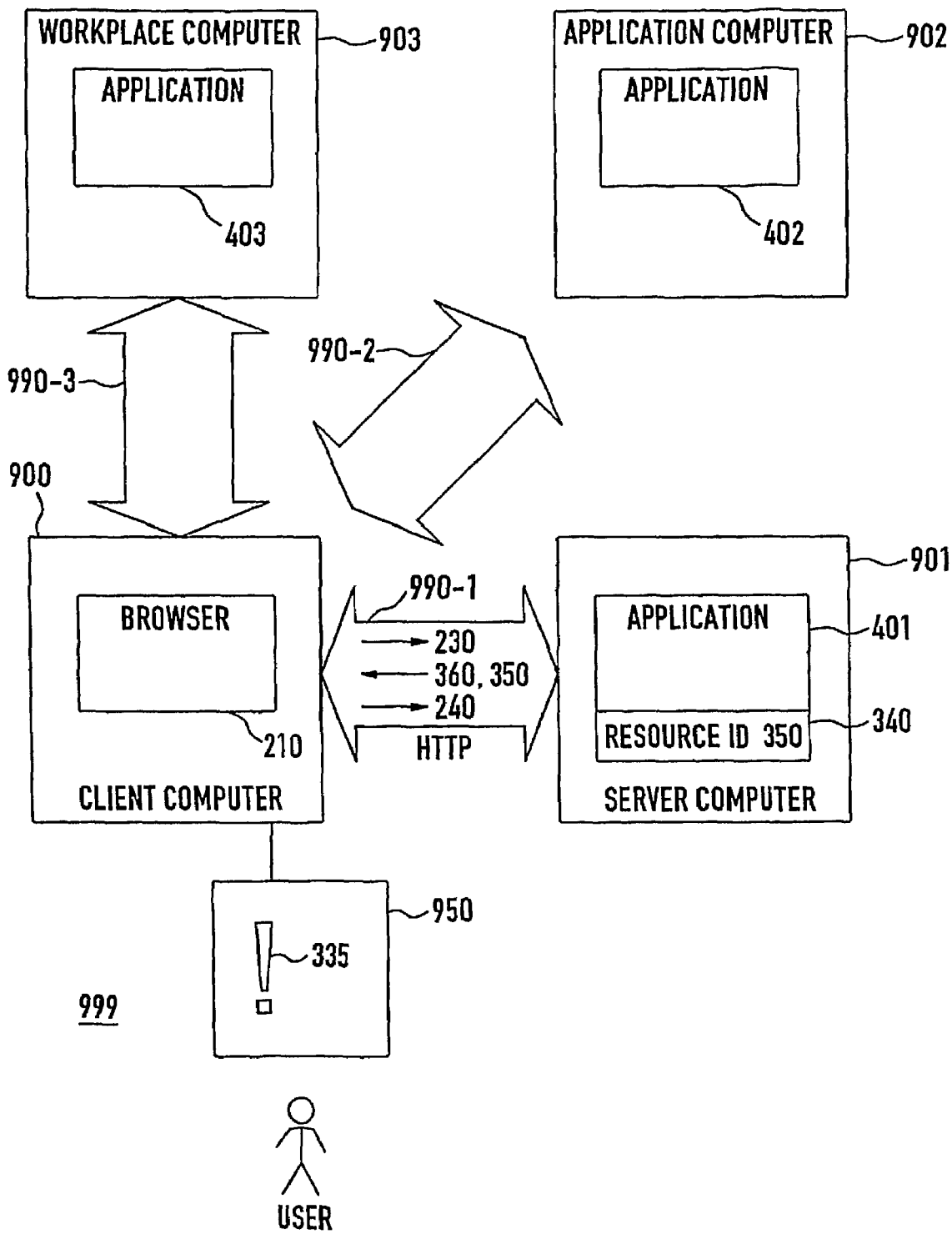
FIG. 2 illustrates a simplified block diagram of the system in that a client computer and a server computer communicate with each other.

FIG. 2 illustrates a simplified block diagram of system 999 including a client computer 900 and a server computer 901 that communicate with each other via network 990 (branch 990-1). Both computers 900 and 901 use the hypertext transfer protocol (HTTP), and client computer 900 further uses HTTP-browser 210. Browser 210 is the program to locate content pages (e.g., in computer 901) and to display the content pages (presentation 21, cf. FIG. 4). Preferably, browser 210 presents graphics as well as text. Preferably, browser 210 is a Netscape Navigator or a Microsoft Internet Explorer.

Usually, server computer 901 executes business application 401. It is an advantage of the present invention, that browser 210 is software that is commercially available as a standard browser. In other words, computer 900 does not require special software that is dedicated for communication with application 401 in computer 901.

During normal operation, browser 210 requests content pages from server computer 901, and server computer 901 responds with content (e.g., HTML pages). Browser 210 then causes display 950 to show content pages to the user. An exemplary content page 335 is symbolized by an exclamation mark.

Similar elements such as display, memory, processor, etc. for the other computers are not illustrated for simplicity. Optionally, client computer 900 also communicates with computers 902 and 903 via branches 990-2 and 990-3, respectively. Further, computers 902 and 903 execute applications 402 and 403, respectively. Optionally, the content pages are generated by application computer 902. Likewise, browser 210 requests pages from application computer 902 and application computer 902 responds with application pages.

Preferably, application 403 assists the user to identify application 401 and 402 out of a plurality of applications that are available in the overall network. Such assistance applications are commercially available from SAP Aktiengellschaft, Walldorf (Baden), Germany under the name "workplace". For convenience, computer 903 is therefore referred to as "workplace computer". Further illustrated elements are: resource 340 (used temporarily), requests 230, 240, instruction 360 and ID 350 (transmitted via the network). The functions of these elements are explained below.

Figure 3:
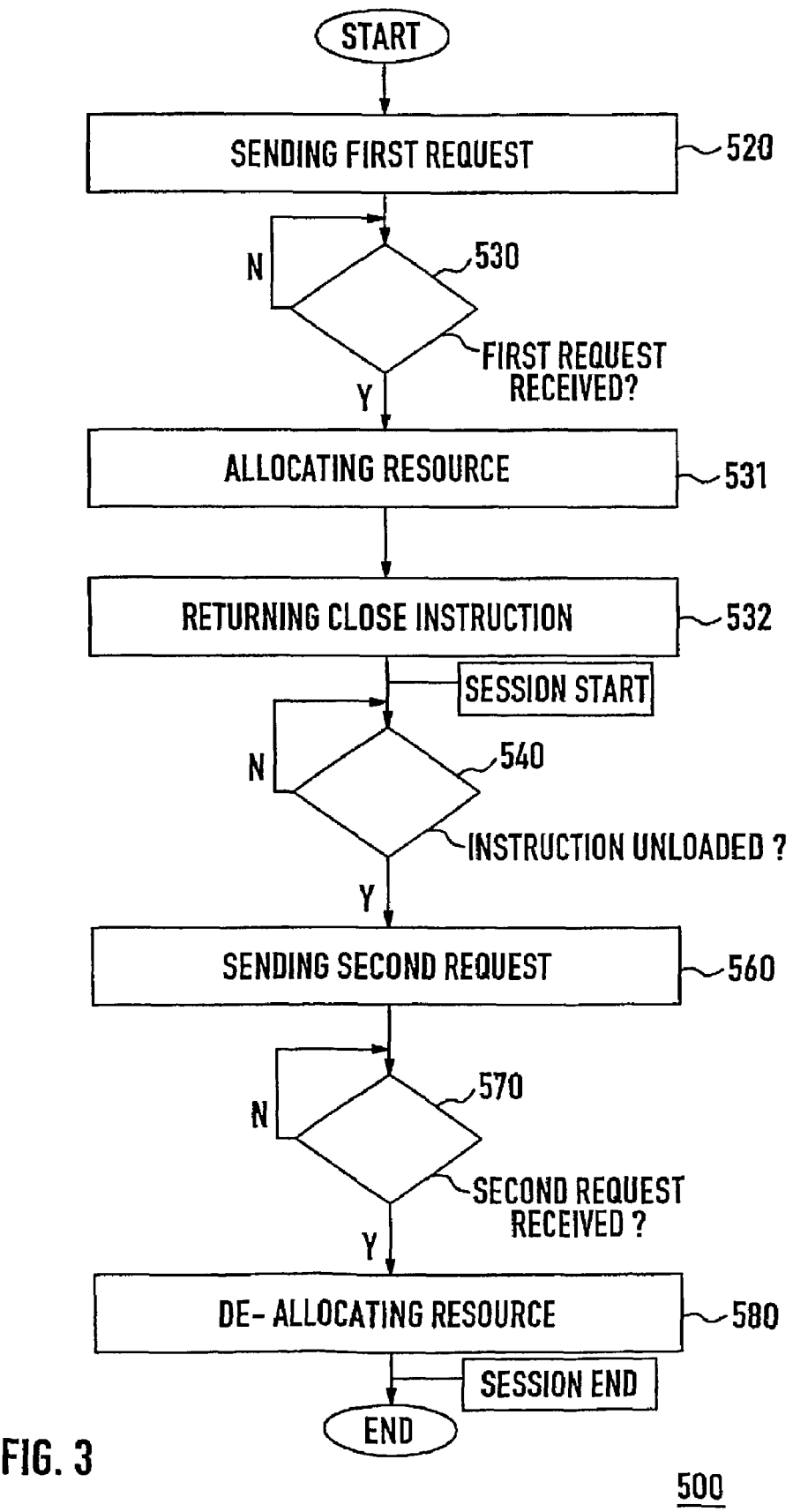
FIG. 3 illustrates a simplified flow chart diagram of a method of the present invention.

FIG. 3 illustrates a simplified flow chart diagram of method 500 of the present invention. Method 500 is a method of communication between client computer 900 and server computer 901. Both computers 900, 901 use the hypertext transfer protocol (HTTP) and client computer 900 uses HTTP-browser 210.

Method 500 comprises the following steps: sending 520 a first request, allocating 531 a resource, returning 532 a close instruction, sending 560 a second request, and de-allocating 580 the resource. Executing the steps depends on predefined conditions; for convenience of explanation, FIG. 3 illustrates the conditions by query symbols and YES/NO questions: upon receiving 530 the first request (received ?), upon unloading 540 the close instruction (unloaded ?), and upon receiving 570 the second request (received ?). If the conditions are met, the execution of method 500 continues (Y=YES), otherwise, the execution of method 500 is suspended (N=NO).

Although referred to as communication between client computer 900 and server computer 901, communication can also occur between client computer 900 and computers 902/903.

The steps are now explained in detail:

In step sending 520, client computer 900 sends first request 230 to server computer 901. Preferably, first request 230 is a unified resource locator (URL) by that client computer 900 identifies business application 401 on server computer 901 (e.g., "http://network-990/server-computer-901/application-401"). First request 230 is also referred to as "client session command" and is also referred to by the acronym "USR_OPEN".

Preferably, first request 230 informs server computer 901 that client computer 900 operates according to method 500. During sending 520, a session is not yet initiated because a session ID is not yet created.

Server computer 901 performs steps 531 and 532 upon receiving 530 first request 230.

In step allocating 531, server computer 901 allocates resource 340 (at server computer 901). Resource 340 has identifier 350 (session identification). Resource 340 is sometimes referred to as "session state". Resource 340 uses memory 921 (cf. explanation of FIG. 1). Identifier 350 is sometimes referred to as "global unique session ID". For example, identifier 350 comprises a text portion with the name of server computer 901 and a numeric portion (<server name><session ID>).

While the present invention is described in connection with a single resource 340, a single session and a single identifier 350, persons of skill in the art are able to implement two or more sessions in parallel.

As used herein, the term "allocate a resource" comprises that server computer 901 stores previous input data and intermediate results.

In step returning 532, server computer 901 returns predetermined close instruction 360 to browser 210. Preferably, close instruction 350 is implemented as a HTML-page that comprises a script (e.g., JavaScript) or a program (e.g., JavaApplet). An example is explained in connection with FIG. 6. Close instruction 360 carries identifier 350. Carrying identifier 350 can be accomplished by means well known in the art. For example, identifier 350 is carried as part of a URL or by a cookie. Reception of identifier 350 by client computer 900 marks the start of a communication session (FIG. 3: SESSION_START), because from now on both, client computer 900 and server computer 901, use identifier 350 that is related to resource 340.

As mentioned, client computer 900 performs step 560 upon unloading 540 close instruction 360 from browser 210. The phrase "upon unloading" is intended to comprise the following:

(1) The user closes browser 210; persons of skill in the art are able to detect this. In the example, explained in connection with FIG. 6, section 6, closing the browser is detected by the script event "onbefore unload" or "onunload".

(2) From the page that implements close instruction 360, the user navigates away to another page. In other words, a new page displaces the old page (cf. FIG. 4, for example, by writing a new address into field 214).

Figure 4:
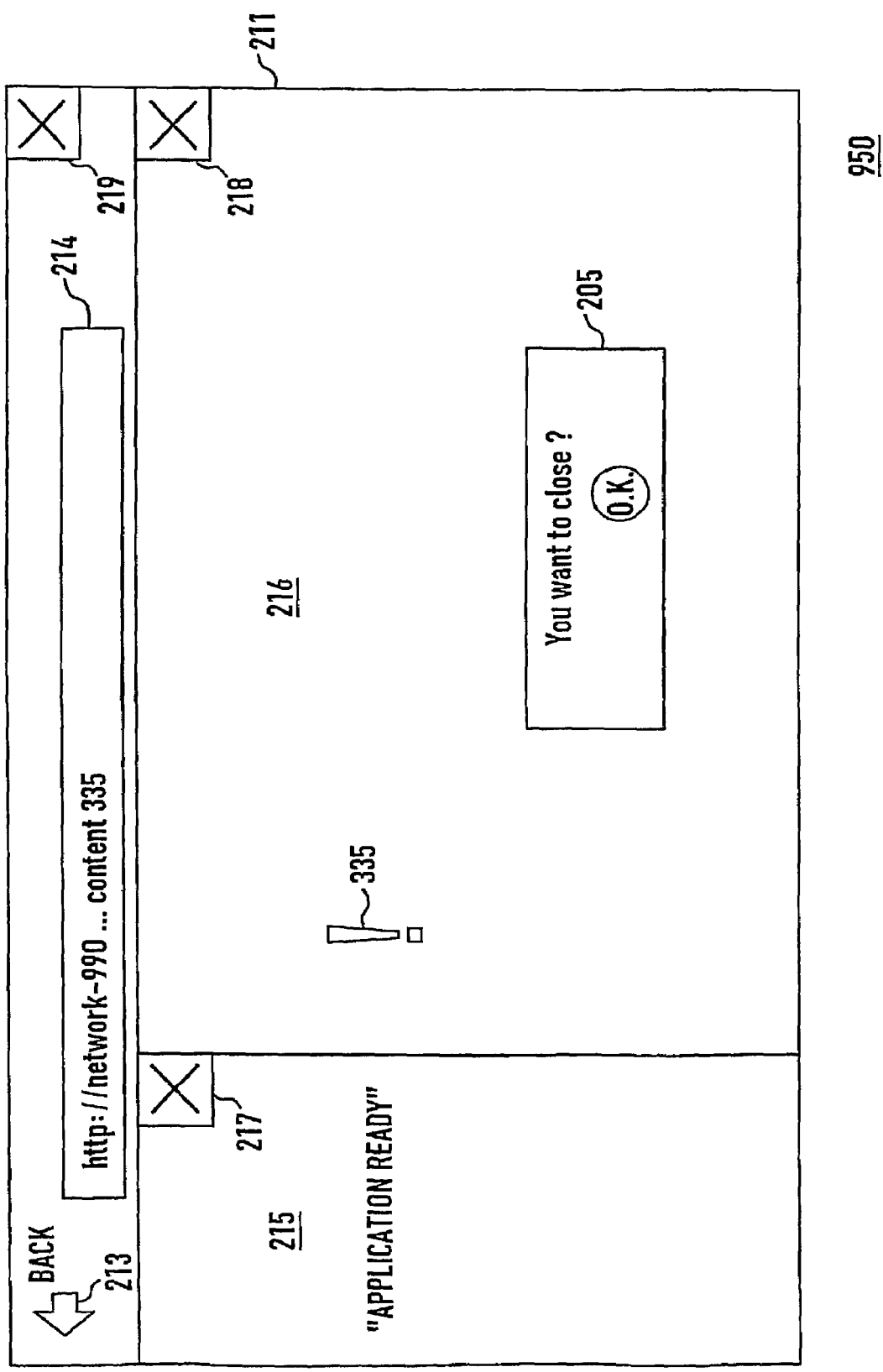
FIG. 4 illustrates a display of the client computer for that a browser shows a first frame and a second frame.

It is also possible—although not required for the present invention—that the user terminates the session explicitly, for example, by operating a functional button such as an "abort session" button (cf. 217, 218 or 219 in FIG. 4 or similar ones).

In step sending 560, client computer 900 sends second request 240 to server computer 901. Second request 240 carries identifier 350. Optionally, second request 240 is initiated by direct user interaction, for example, by activating a dedicated button. Second request 240 requires valid identifier 350. Sending 560 second request 240 is the defined way of notifying server computer 901 that client computer 900 terminates the session.

Server computer 901 performs step 580 upon receiving 570 second request 240. Second request 240 is understood by server computer 901 so that in step de-allocating 580, server computer 901 de-allocates resource 340. De-allocating is the opposite of allocating; server computer 901 discards previous input data (e.g., from the user) and intermediate results (e.g., of application 401).

Optionally, de-allocating comprises that server computer 901 transfers input data and intermediate results to other memory areas that are reserved for application 401. This is often the case when application 401 responds to a user request to place an order for a commercial item and the user finishes a business transaction.

When resource 340 has been de-allocated from server computer 901, the session has come to its end (FIG. 3: SESSION_END). Server computer 901 does not need to send a response to second request 240 to client computer 900. Optionally, server computer 901 responds by a minimum response (e.g., "<HTML></HTML>")

FIG. 4 illustrates display 950 of client computer 900 with which HTTP-browser 210 (cf. FIG. 2) generates browser presentation 211. Browser presentations are well known in the art. In the example of FIG. 4, presentation 211 has back button 213, address field 214, close button 219, warning 205 and a display area for showing frames.

According to a preferred embodiment, presentation 211 shows first frame 215 and second frame 216, each having close buttons 217 and 218, respectively. Since, preferably, frame 215 is presented prior to frame 216, the frames are also referred to as parent frame 215 and child frame 216. Browser 210 implements close instruction 360 into first frame 215. Displaying frame 215 is optional.

Address field 214 shows the HTTP-address (URL) of content 335: "http://network-990/server-computer-901/application-401/content-335". Browser 210 has requested content page 335 by forwarding the mentioned URL to server computer 901. Browser 210 shows content page 335 (exclamation mark symbol) received from server computer 901 (e.g., from application 401) in second frame 216. Frame 216 is conveniently an integrated frame IFRAME.

Splitting the display screen into frames 215, 216 is convenient for the user. Frame 215 informs that session management (cf. method 500) is active, for example, by informing that the user can now access application 401 (e.g., "APPLICATION READY").

FIG. 4 also conveniently illustrates exit buttons 217, 218, 219 by X-symbols. If the user operates either one, browser 210 detects this as unloading 540 (cf. FIG. 3). This is an advantage of the present invention. The user is free to close a frame (button 217, 218) or even to close browser 210 (button 219) at any time, and the further steps 560-580 terminate the session.

Warning 205 is optional and informs the user that browser 210 is sending out second request 240. In the example of FIG. 4, warning 205 appears after the user has caused the unloading event (cf. FIG. 3, 540), and warning 205 asks the user for confirmation.

Figure 5:
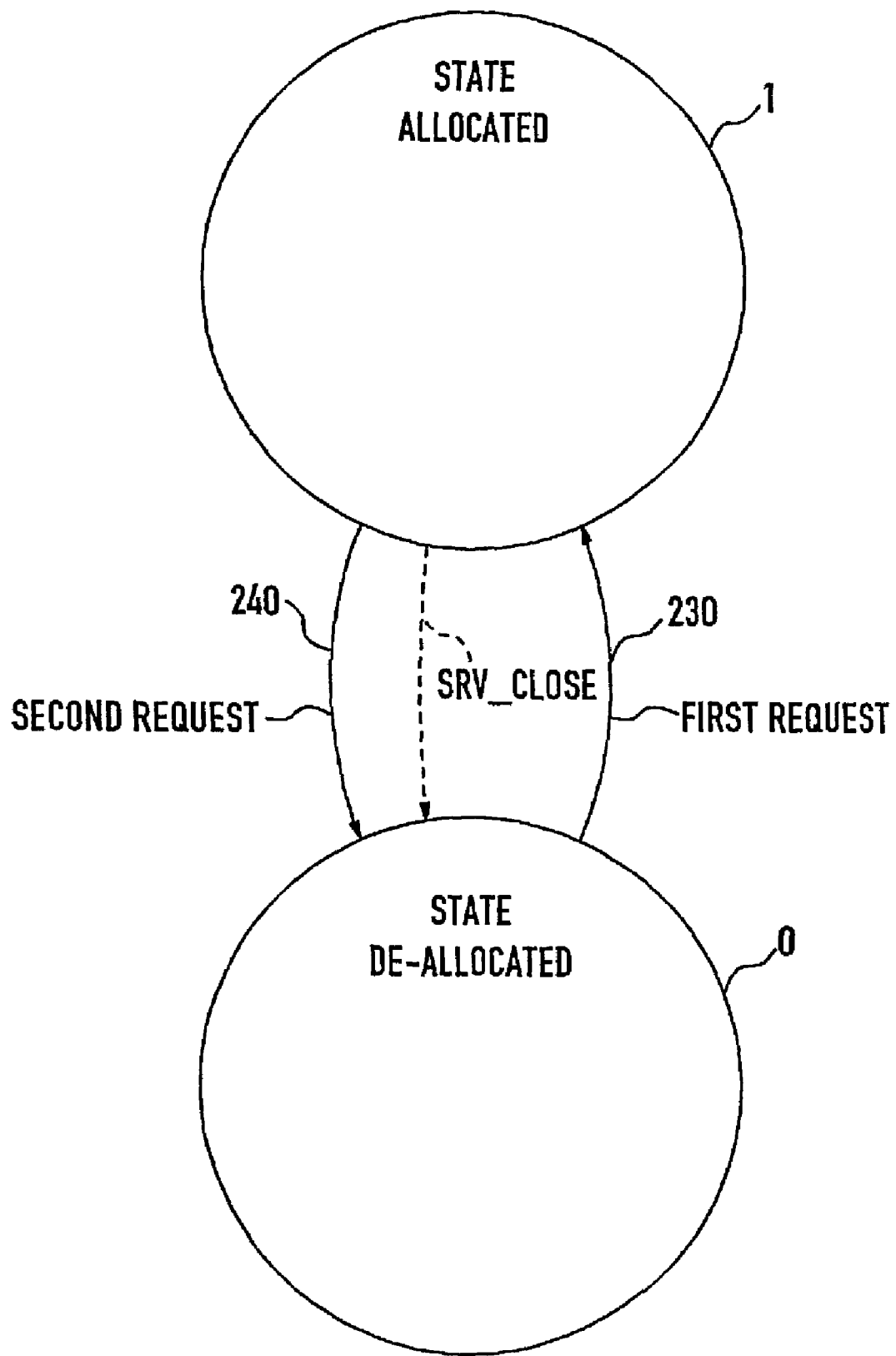
FIG. 5 illustrates a simplified state diagram for a resource that is allocated in the server computer.

FIG. 5 illustrates a simplified state diagram for resource 340 that is allocated or de-allocated in server computer 901. As mentioned, performing method 500 leads to allocate or to de-allocate resource 340. As indicated by plain arrows, first request 230 leads to the state 1 "allocated" (also: "state-full") and second request 240 leads to the state 0 "de-allocated" ("state-less").

Optionally, indicated by dashed arrows, de-allocation can be triggered by a request ("SRV_CLOSE") from application 401. In this case, server computer 901 notifies browser 210 in client computer 900 to remove ("session closed information") instruction 360 from browser 210 or to re-direct browser 210.

Performing session management by method 500 can be (a) central session management, or (b) distributed session management.

In case (a), close instruction 360 is part of a session manager that resides on client computer 900 and that is, preferably, responsible for multiple sessions. In other words, such a session manager performs the method steps in parallel for multiple applications (such as 401 or 402) for multiple resources (such as 340) by receiving multiple instructions (such as 360) in parallel. Optionally, code to perform the method steps is forwarded to client computer 900 from workplace computer 903. In other words, server computer 901 (or application computer 902) cooperates with workplace computer 903 to provide multiple identification for these multiple resources.

When frames are used, preferably, a single parent frame (e.g., frame 215, FIG. 4) has multiple child frames (e.g., frame 216) for each resource (also referred to as "workspaces" or "channels"). The present invention allows to scale session management to multiple computers, applications and resources.

In case (b), client computer 900 receives instruction 360 from server computer 901. The following example in connection with FIG. 6 uses a close instruction that is created for each session.

FIG. 6 is a simplified code listing of instruction 360. Browser 210 conveniently loads instruction 360 into a parent frame. Displaying the parent frame conveniently informs the user that session management is active. But displaying the frame is not important.

For convenience of explanation herein, multiple instructions are sometimes placed on single lines whereas programmers would have placed them on separate lines. This is especially true for well-known syntax.

Code section 1 defines HTML as language, a head portion (sections 1-4), a title that is conveniently chosen as "instruction-360", as well as defines the script language JavaScript.

Code section 2 defines a global string to store second request 240 (referred to as "termination URL") for the session in child frame 216. In the example, request 240 does not have any other content. It is sufficient to target second request 240 by identifier 350 to an address in server computer 901 that is reserved for de-allocating resource 340 (for example, http://network-990.server-computer-901.application-401.resource-340").

Code section 3 defines a function "sending_560_second_request( )" that implements step 560. For convenience of explanation, the function further displays a message with the complete text "Client . . . ". The message reads as: "Client computer 900 is now sending 560 second request 240 to server computer 901. Second request 240 is the following URL . . . "

Code section 4 defines a function to store received session identifier 350 (here: identifier contains only the termination URL).

Code section 5 closes the above script and head sections.

Code section 6 defines "upon unloading 540" by the event "onunload" and defines that step 560 is then executed.

Code section 7 is not required for the present invention. For convenience of explanation, section 7 provides a display that reports method steps that took place in the past:

This is first frame 215. Client computer 900 with browser 210 had been sending 520 first request 230 (e.g., by URL http://network-990/server-computer-901 /application- 401) to server computer 901. Upon receiving 530 first request 230, server computer 901 had been allocating 531 resource 340 with identifier 350 and had been returning 532 predetermined close instruction 360 in the form of the present HTML-document "instruction-360.htm" with identifier "340". Close instruction 360 carries identifier 350 ("340"). HTML-document "instruction-360.htm" comprises a termination command in the program section 6 with "onunload". The session has now started.

Code Section 8 is optionally and informs the user that content pages 335 are indicated inside a content frame.

Code section 9 is also optional and identifies content page 335 as an IFRAME to display a HTML-file at a given address. IFRAMES are well known in the art.

Code section 10 provides conventional HTML-syntax.

The following explains advanced session management features (c) "timer" and (d) "cache prevention" that are optionally implemented according to the present invention.

The advanced session management feature (c) "time" is explained below.

Figure 7:
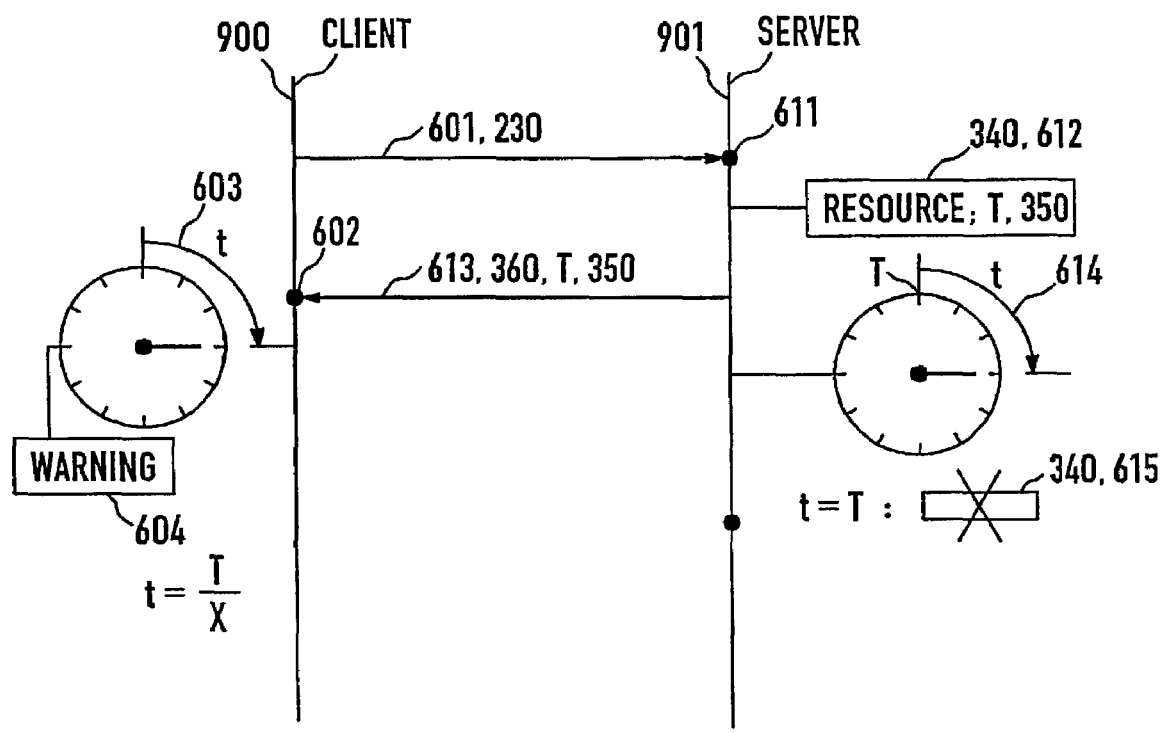
FIG. 7 illustrates a simplified diagram of the method of the present invention in a further embodiment by way of example.

FIG. 7 illustrates a simplified diagram of a method of the present invention in a further embodiment by way of example. Method 600 for communication between client computer 900 and server computer 901 (symbolized by vertical lines) via HTTP (computer 900 with HTTP-browser 210) comprises the following steps:

sending 601 first request 230 from client computer 900 to server computer 901 (symbolized by an arrow to the right); upon receiving 611 (point symbol) first request 230, server computer 901 (right line) executes the steps allocating 612 resource (cf. step 531 in FIG. 3), returning 613 close instruction (cf. step 532), measuring 614 time and de-allocating 614 resource (cf. step 580); and upon receiving 602 close instruction, client computer 900 (left line) executes the steps measuring 603 time, and displaying 604 warning.

Details for the steps at server computer 901 are as follows:

In step allocating 612, server computer 901 allocates resource 340 (cf. FIG. 2), resource 340 has identifier 350 (e.g., URL to resource 340) and has a time-out period T. In the example, the period T is 60 seconds corresponding to a full pointer turn in a simplified clock symbol. In step returning 613, server computer 901 returns close instruction 360 to client computer 900 (similar as described by the other figures) . Close instruction 360 also transfers a representation of timeout period T (e.g., a number "60" at a predetermined location in HTML) and transfers identifier 350. In step measuring 614, server computer 901 measures the time t during that communication between client computer 900 and server computer 901 is idle. In FIG. 7, t is 15 seconds. The term "idle" as used herein is intended to describe the absence of content page requests from client computer 900 that access resource 340 in the present session (as defined in connection with FIG. 3); communication that relates to other applications is not considered here. In step de-allocating 615, server computer 901 de-allocates resource 340 when the measured time t reaches time-out period T, for example after 60 seconds (from receiving 611).

Details for the steps at client computer 900 are as follows: In step measuring 603, client computer 901 measures the time t during that the communication between client computer 900 and server computer 901 is idle. In step displaying 604, client computer 901 issues a warning (orally or visually, e.g., similar to 205 in FIG. 4) to the user if measured time t reaches a predetermined fraction T/X of the time-out period T. In the example (X=4/3), the fraction is reached after 45 seconds. Since identification 360 of resource 340 has been transmitted to client computer 900, the user can now respond by communicating with server computer 901 to refresh (set t=0).

The advanced session management feature (d) "cache prevention" is explained further below.

Figure 8:
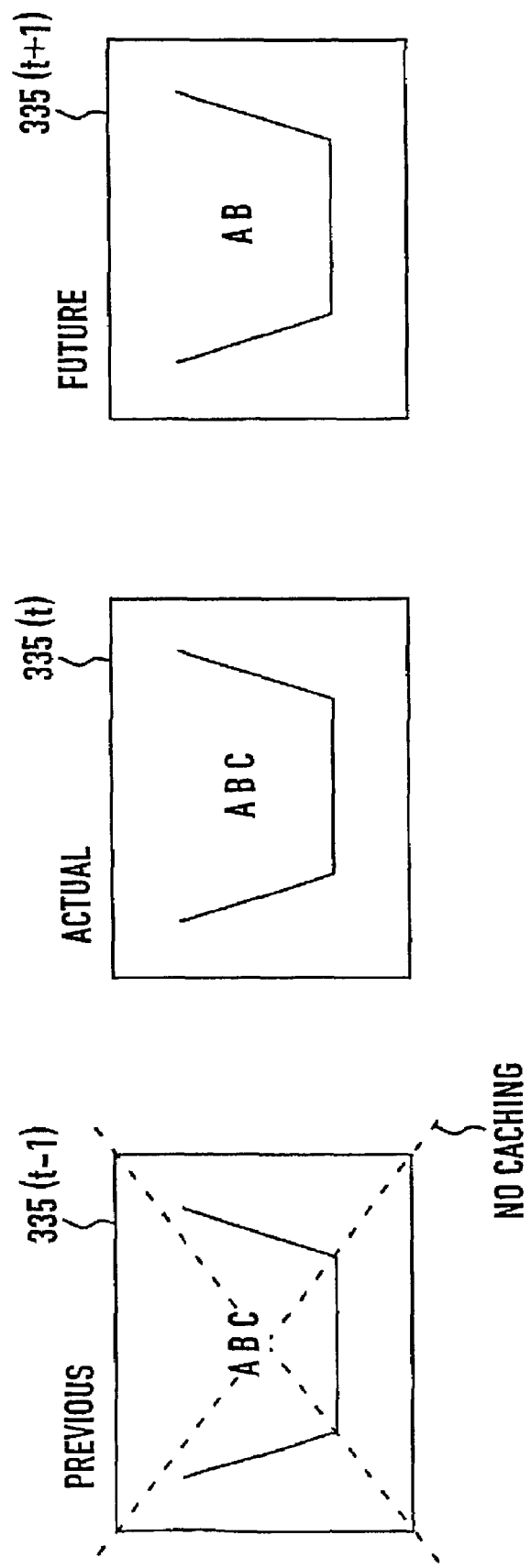
FIG. 8 illustrates simplified diagrams of content pages at a previous time point, at an actual time point and at a future time point.

FIG. 8 illustrates simplified diagrams of content pages 335 at a previous time point (t−1), at an actual time point (t) and at a future time point (t+1). Browser 210 usually has back button 213 (often named "BACK", cf. FIG. 4), and browser 210 allocates a cache (not illustrated) in memory 920 to temporarily store content pages 335.

When the user presses back button 213, browser 210 changes the display from actual content page 335 at actual time point (t) to previous content page 335 at previous time point (t−1).

As long as application 401 in server computer 901 is a read-only type application and content pages 335 substantially remain unchanged, displaying cached pages is convenient. In some instances, especially for business applications, intermediate results stored in resource 340 at server computer 901 diverge from temporarily cached content pages 335(t-1) on client computer 900. This is no longer convenient and might cause serious problems.

For example, application 401 is a shopping application. The user has located some items ABC into an shopping basket icon on content page 335(t). Resource 340 (cf. FIG. 2) stores ABC; previous content page 335(t−1) in the cache comprises ABC as well. The user now completes the shopping transaction and therefore requests a further content page with payment procedures (not illustrated). Now the user, most likely being influenced by the total payable amount for ABC, removes item C from the basket icon: application 401 returns content page 335(t+1) that shows AB; resource 340 (cf. FIG. 2) stores AB as well. The user now unintentionally presses back button 213 but sees cached page 335(t−1) with ABC. Now the display ABC on client computer 900 and intermediate results AB in server computer 901 are different.

According to the present invention, optionally, close instruction 360 prevents content pages 335 from being cached by browser 210. This is illustrated by dashed lines crossing out content page 335(t−1). Even if the user presses back button 213, content pages are reloaded from server computer 900 (here: AB). It is convenient not to apply this rule to all content pages 335. Preferably, server computer 901 distinguishes cache-prevented content pages 335 from cache-allowed content pages 335 by attaching tags or by other means.

The following describes an optional implementation of distributed session management.

Figure 9:
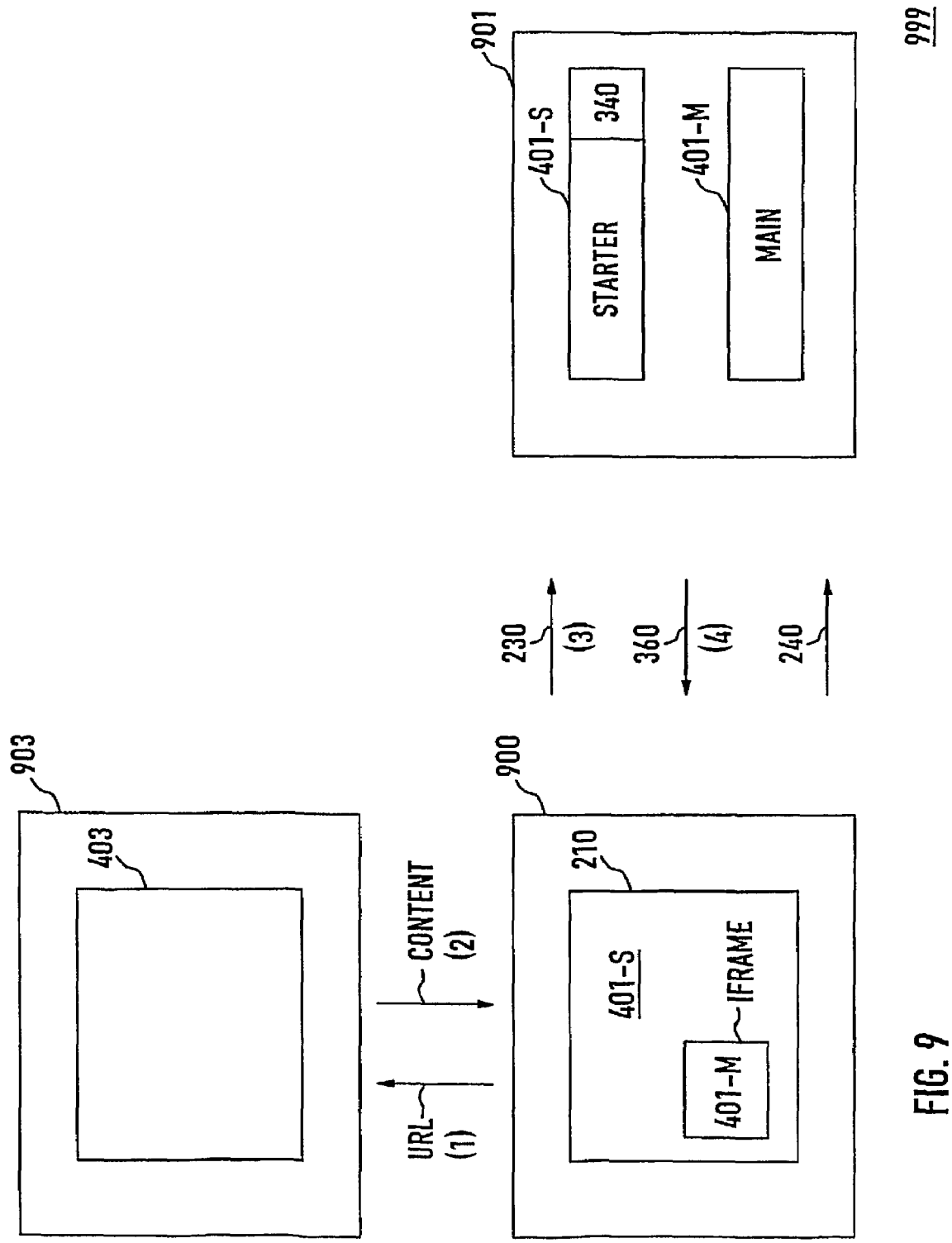
FIG. 9 illustrates a simplified diagram of the computer system in further optional method implementations.

FIG. 9 illustrates a simplified diagram of computer system 999 for further optional method implementations. Illustrated are computers 900, 901 and 903. Applications are distinguished into main (M) and starter (S) applications, addressed by equal domain names. By providing close instructions, the starter applications (S) provide session management functionality according to the present invention (methods 500 and 600). The example of FIG. 9 is simplified to application 401. Persons of skill in the art can use the same scheme for multiple applications (with different domains) in parallel and independent from each other. The advanced session management feature (d) "cache prevention" is explained further below.

(1) The user (of client computer 900) sends a URL to the assistance application 403 (the "workplace") on workplace computer 903 ("http://network-990 . . . computer-903-/application-403").

(2) Application 403 forwards content pages to browser 210 on client computer 900; the pages offer a number of applications, such as main application 401-M. A hyperlink goes to the corresponding starter application 401-S. (http://network-990 . . . application-401-S). Application 401-S is a starter for application 401-M (in computer 900). The domain "server-computer-901" is identical for starter application 401-S and main application 401-M.

(3) The user-selects the hyperlink to application 401-S; client computer 900 sends request 230 to server computer 901.

(4) Starter application 401-S allocates resource 340 (cf. step 531) and returns (cf. step 532) instruction 360 to client computer 900; instruction 360 has session management code (e.g., as in FIG. 6, code sections 3, 6).

(5) Instruction 360 has code that instructs browser 210 to open IFRAME (e.g., similar as in FIG. 6, code section 9). IFRAME is associated with a link to main application 401-M (not to the starter, but to the application itself). The user now interacts with main application 401-M.

(6) Upon unloading (cf. condition 540), browser 210 sends second request 240 to starter application 401-S that de-allocates resource 340 and interacts with application 401-M.

Figure 10:
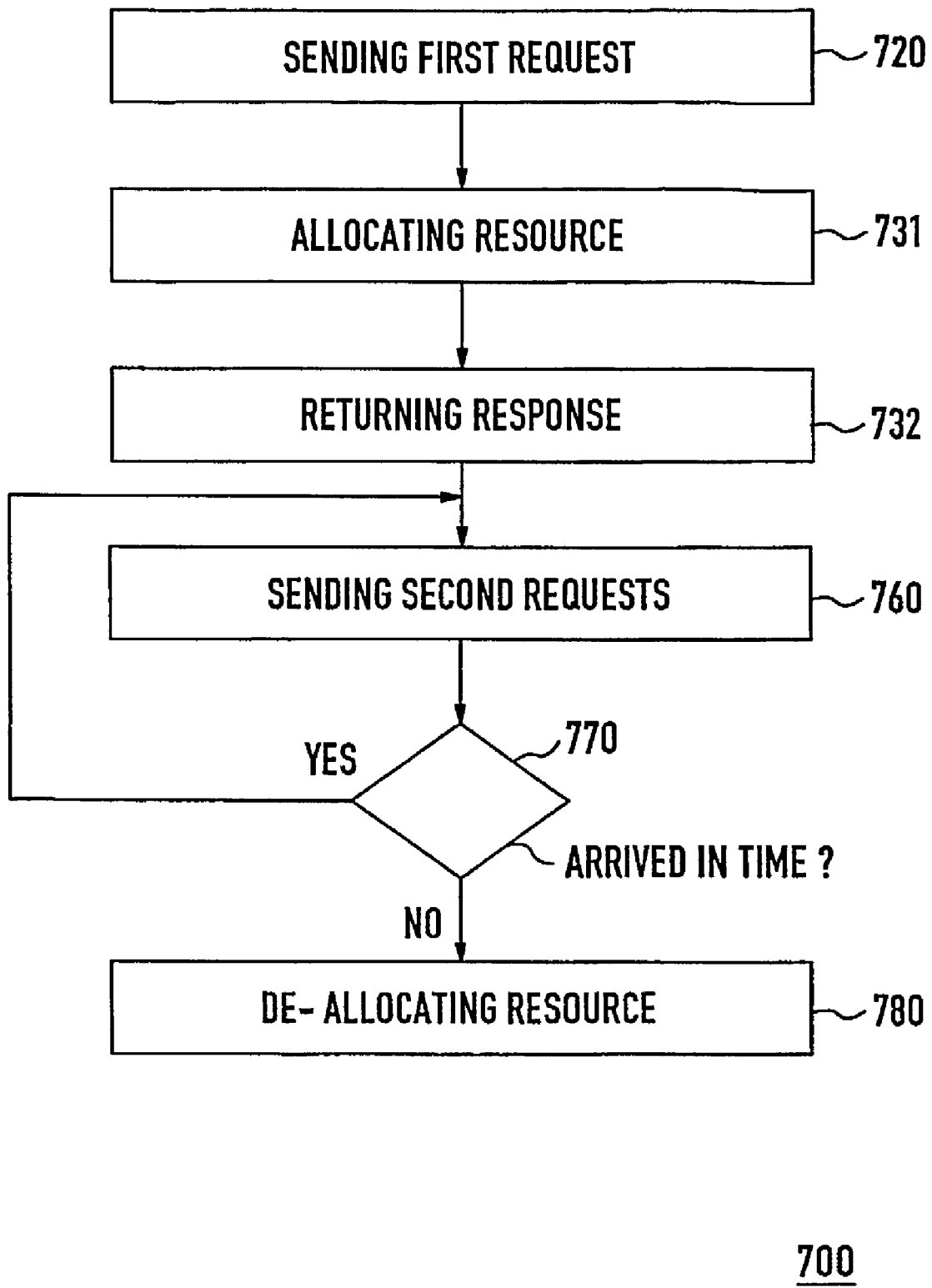
FIG. 10 illustrates a simplified flow-chart diagram of the method of the present invention in a still further embodiment.

The following describes a still further optional embodiment (f):

FIG. 10 illustrates a simplified flow-chart diagram of the method of the present invention in a still further embodiment. Method 700 for communication between client computer 900 and server computer 901 (HTTP, client with browser 210) comprises the following steps: sending 720 first request 230 from client computer 900 to the server computer 901 (cf. FIG. 2); allocating 731 resource 340 at the server computer 901 (cf. FIG. 2), resource 340 with identifier 350 (Cf. FIG. 2); returning 732 a predetermined response page (similar as instruction 360) to browser 210, the response page carrying identifier 350 and carrying browser instructions; as instructed by the response page, periodically sending 760 second requests 240 (cf. FIG. 3) by browser 210 to server computer 901 (second requests 240 carrying the identifier 350); and at server computer 901, periodically checking 770 the arrival of second requests 240 with the identifier 350 ("ARRIVED IN TIME ?") from client computer 900 and de-allocating 780 resource 340 in case a predetermined time period (T) has lapsed since the last arrival ("ARRIVED IN TIME ? NO").

If the responses arrive in time ("YES"), resource 340 remains allocated. This preferred embodiment allows to de-allocate a resource even if client computer is not longer in operation (e.g., after a crash). Optionally, step de-allocating 780 is performed after confirmation by the user.

The present invention can also be considered as computer program product (CPP) 100/101 for HTTP-communication between client computer 900 and server computer 901. Program product (100/101) has program code portions 100 that cause client processor 910 (cf. FIG. 1) in client computer 900 and program code portions 101 in server processor 911 in server computer 901 (cf. explanation of FIG. 1) to control the communication as described in method 500/600/700. The foregoing description is also applicable for computer system 999 in that client computer 900 and server computer 901 communicate as described.

| List of References | |
|---|---|
| Reference | Element |
| 1, 2, 3, . . . 10 | code sections |
| 100 | client program portion of CPP |
| 100/101 | computer program product (CPP) |
| 101 | server program portion of CPP |
| 205 | warning |
| 210 | HTTP-browser |
| 211 | presentation by browser |
| 213 | back button |
| 214 | address field |
| 215 | first frame "parent" |
| 216 | second frame "child" |
| 217, 218, 219 | close button |
| 230 | first request |
| 240 | second request |
| 335 | content page |
| 335 (t − 1) (t) (t + 1) | previous, actual, future content page |
| 340 | resource |
| 350 | identifier (ID) |
| 360 | close instruction |
| 401 | application on server computer 901 |
| 401-M, 401-S | main and starter application |
| 402 | application on application computer 902 |
| 403 | application on workplace computer 903 |
| 500 | method |
| 520 | sending first request |
| 530 | upon receiving |
| 531 | allocating resource |
| 532 | returning close instruction |
| 540 | upon unloading |
| 560 | sending second request |
| 570 | upon receiving |
| 580 | de-allocating resource |
| 600 | method (embodiment) |
| 601-604 | steps by client computer 900 |
| 611-615 | steps by server computer 901 |
| 700 | method (embodiment) |
| 720, 760 | sending first and second requests |
| 731, 780 | allocating, de-allocating |
| 732 | returning response page |
| 770 | checking |
| 900 | client computer |
| 901 | server computer |
| 902 | workplace computer |
| 903 | application computer |
| 910, 911 | processor |
| 920 | memory |
| 930 | bus |
| 940 | input device |
| 950 | output device |
| 960 | user interface |
| 970 | carrier |
| 980, 981, 982 | signal |
| 990 | network |
| 990-1, 990-2, 990-3 | network branches |
| 999 | computer system |

The invention claimed is:

1. A method for communication between a client computer and a server computer, wherein both the client computer and the server computer use the hypertext transfer protocol (HTTP) and the client computer uses an HTTP-browser, the method comprising:

sending a first request from the client computer to the server computer;

upon receiving the first request from the client computer, the server computer establishing a session by allocating a resource at the server computer, the resource including an identifier, and returning, to the browser at the client computer and in response to the first request, a predetermined close instruction, the predetermined close instruction carrying the identifier identifying the session at the server computer to be de-allocated when the identifier is returned from the browser upon unloading, the predetermined close instruction representative of a start of a communication session between the client computer and the server computer;

upon unloading at the browser the predetermined close instruction received from the server computer, sending a second request from the client computer to the server computer to indicate initiation of the predetermined close instruction by the browser, the second request carrying the identifier and indicating to de-allocate the resource at the server computer, the predetermined close instruction, when received, preventing the browser from using content in a cache at the client computer, such that the browser uses content from the server computer, the predetermined close instruction including a time-out period representative of an idle time associated with a lack of content page requests from the client computer to the server computer, the server computer de-allocating the resource when the idle time reaches the time-out period, wherein upon unloading includes at least one of a closing of the browser and a navigating away to another page presented at the browser; and upon receiving the second-request from the client computer, the server computer de-allocating the resource.

2. The method of claim 1, wherein after the server computer has returned the predetermined close instruction, and before the server computer receives the second request from the client computer, the server computer consecutively sends content pages to the client computer.

3. The method of claim 2, wherein in the step returning a predetermined close instruction, the browser presents the close instruction in a first frame and presents the contents in a second frame.

4. The method of claim 2, wherein the close instruction prevents selected content pages from being cached by the browser.

5. The method of claim 1, wherein in the step sending a second request, the client computer sends the second request to a predetermined address of the server computer.

6. The method of claim 1, wherein in the step returning a predetermined close instruction, the predetermined close instruction comprises script.

7. The method of claim 1, wherein in the step returning a predetermined close instruction, the script does not lead to a presentation by the browser.

8. A computer program product for HTTP communication between a client computer and a server computer, wherein the client computer includes a browser, the computer program product including program code portions embodied in a computer readable storage medium that cause a client processor in the client computer and a server processor in the server computer to control the communication, the computer program product further comprising:

code portions that cause the client processor to send a first request to the server computer;

code portions that—upon receiving from the client computer the first request by the server computer—cause the server processor to allocate a resource at the server computer, the resource including an identifier, and return, to the browser and in response to the first request, a predetermined close instruction, the predetermined close instruction carrying the identifier identifying the session at the server computer to be de-allocated when the identifier is returned from the browser upon unloading, the predetermined close instruction representative of a start of a communication session between the client computer and the server computer;

code portions that upon unloading at the browser the predetermined close instruction received from the server computer—cause the client processor to send a second request to the server computer to indicate initiation of the predetermined close instruction by the browser, the second request carrying the identifier and indicating to de-allocate the resource at the server computer, the predetermined close instruction, when received, preventing the browser from using content in a cache at the client computer, such that the browser uses content from the server computer, the predetermined close instruction including a time-out period representative of an idle time associated with a lack of content page requests from the client computer to the server computer, the server computer de-allocating the resource when the idle time reaches the time-out period, wherein upon unloading includes at least one of a closing of the browser and a navigating away to another page presented at the browser; and code portions that—upon receiving the second request from the client computer—cause the server processor to de-allocate the resource.

9. The computer program product of claim 8, wherein the code portions cause the client processor to provide such a close instruction that the browser provides a first frame to present the close instruction in a first frame and provides a second frame to present content pages that the client computer receives from the server computer.

10. The computer program product of claim 8, wherein the code portions cause the client processor to provide such a close instruction that caching of selected content pages by the browser is prevented.

11. The computer program product of claim 8, wherein the code portions cause the client processor to provide such a close instruction that the client computer sends the second request to a predetermined address of theserver computer.

12. A computer readable medium storing the program code portions of the computer program product of claim 8 that cause the client processor to operate.

13. A computer readable medium storing the program code portions of the computer program product of claim 8 that cause the server processor to operate.

14. A computer system including a client computer and a server computer, wherein both the client computer and the server computer use HTTP for communication and the client computer uses an HTTP-browser, the computer system characterized in that:

the client computer sends a first request to the server computer;

the server computer upon receiving from the client computer the first request allocates a resource, the resource including an identifier, and returns, to the browser at the client computer and in response to the first request, a predetermined close instruction, the close instruction carrying the identifier identifying the session at the server computer to be de-allocated when the identifier is returned from the browser upon unloading, the predetermined close instruction representative of a start of a communication session between the client computer and the server computer;

the client computer, upon unloading at the browser the predetermined close instruction received from the server computer, sends a second request to the server computer to indicate initiation of the predetermined close instruction by the browser, the second request carrying the identifier and indicating to de-allocate the resource at the server, the predetermined close instruction, when received, preventing the browser from using content in a cache at the client computer, such that the browser uses content from the server computer, the predetermined close instruction including a time-out period representative of an idle time associated with a lack of content page requests from the client computer to the server computer, the server computer de-allocating the resource when the idle time reaches the time-out period, wherein upon unloading includes at least one of a closing of the browser and a navigating away to another page presented at the browser; and the server computer, upon receiving the second request from the client computer, de-allocates the resource.

15. The computer system of claim 14, wherein the client computer presents the close instruction in a first frame and presents the content pages in a second frame.

16. The computer system of claim 14, wherein the server computer provides the close instruction such that in the client computer the close instruction prevents selected content pages from being cached by the browser.

* * * * *

UNITED STATES PATENT AND TRADEMARK OFFICE
CERTIFICATE OF CORRECTION

PATENT NO. : 7,606,901 B2
APPLICATION NO. : 10/049522
DATED : October 20, 2009
INVENTOR(S) : Heymann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 852 days.

Signed and Sealed this

Twelfth Day of October, 2010

David J. Kappos
*Director of the United States Patent and Trademark Office*